No. 892,241. PATENTED JUNE 30, 1908.
H. FREISE.
METHOD OF ELECTRICALLY DETECTING DANGEROUS GASES AND APPARATUS THEREFOR.
APPLICATION FILED JUNE 10, 1907.
2 SHEETS—SHEET 1.
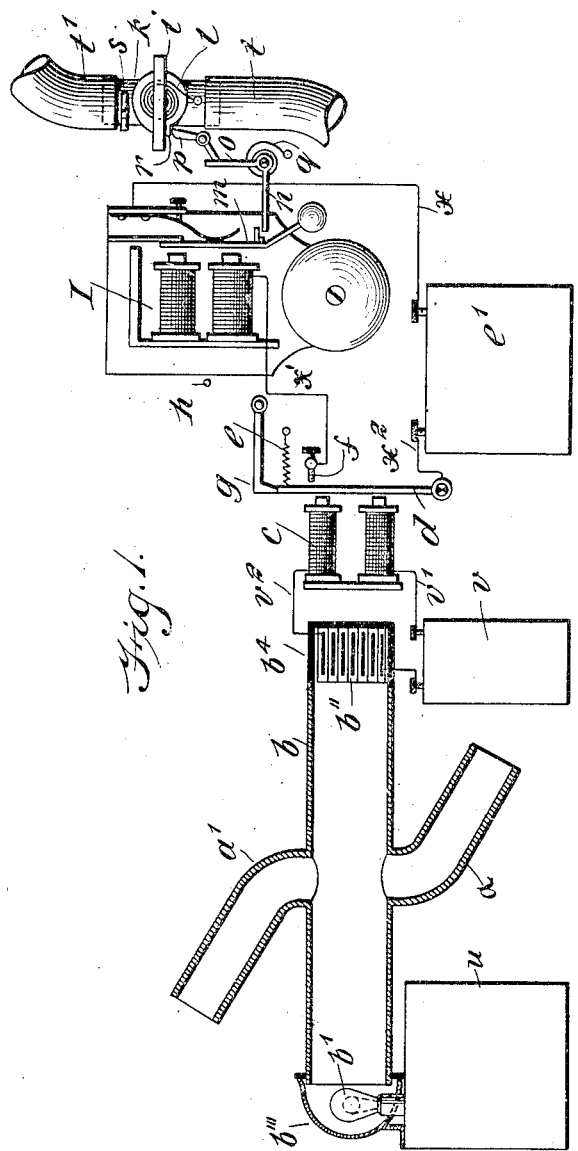
WITNESSES
INVENTOR
Heinrich Freise
BY
ATTORNEY

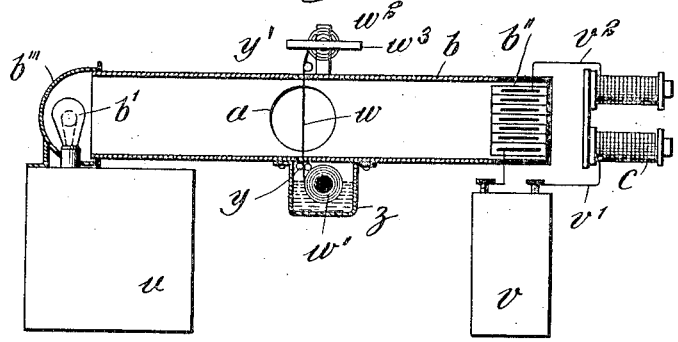
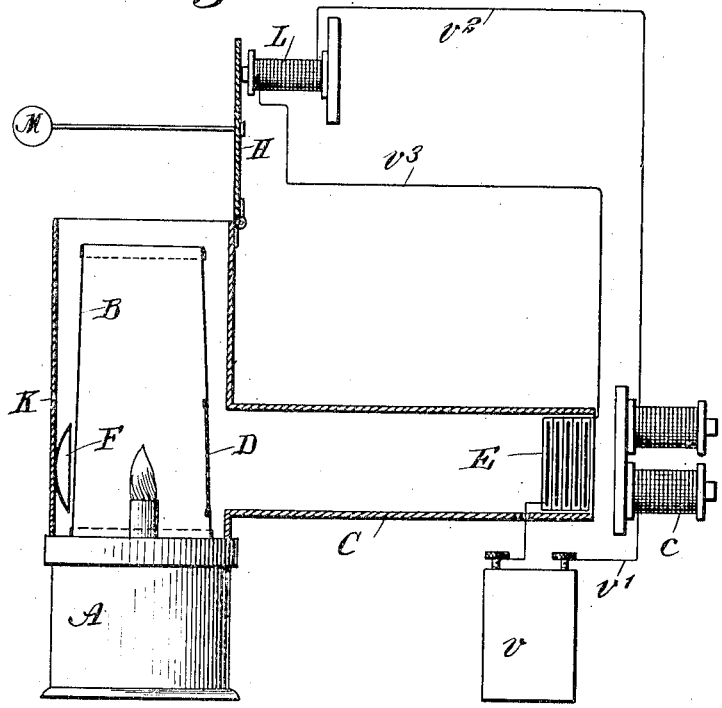

UNITED STATES PATENT OFFICE.

HEINRICH FREISE, OF BOCHUM, GERMANY.

METHOD OF ELECTRICALLY DETECTING DANGEROUS GASES AND APPARATUS THEREFOR.

No. 892,241.   Specification of Letters Patent.   Patented June 30, 1908.

Application filed June 10, 1907. Serial No. 378,223.

*To all whom it may concern:*

Be it known that I, HEINRICH FREISE, a citizen of the Empire of Germany, residing at Bochum, in the Empire of Germany, have invented a new and useful Method of Electrically Detecting Dangerous Gases and Apparatus Therefor, of which the following is a specification.

My invention consists of a method of electrically detecting any dangerous opaque or transparent gases and of actuating alarm devices and if so preferred also other devices for removing the danger or the like.

My invention further consists of apparatus for carrying into effect the said method.

According to my method a source of light, a selenium cell and a device for projecting rays of light from said source of light to said selenium cell are employed. I further provide a primary circuit including the said selenium cell, so that normally the resistance of the latter is reduced and a current of sufficient strength circulates in the primary circuit. The dangerous gas is passed across the rays of light and if it is opaque it will at once darken the selenium cell, so that the resistance of the latter will increase and the strength of the current circulating in the primary circuit will decrease. An electromagnet is inserted in the primary circuit, so that it is normally energized for attracting its armature. I provide a secondary circuit, which is adapted to be closed by the armature of said electromagnet on the same being released and it includes an electric alarm and, if so preferred, other devices. If actually dangerous opaque gas (such as for example smoke) is from some reason formed and passes across the rays of light, it will darken the selenium cell, when the strength of the current circulating in the primary circuit will be diminished, so that the electromagnet will release its armature, which is detached by a spring and closes the secondary circuit, whereupon the electric alarm will sound and the other devices, if there are any, will be actuated. If the dangerous gas is transparent, such as foul gases in a colliery or the like, I may provide means for passing a transparent band impregnated with suitable chemicals through the current of gas between the device for projecting rays of light and the selenium cell. The said chemicals are of such a kind as to render under the action of the dangerous transparent gas the band more or less opaque, so that the same effect as described above is obtained. Or I may provide means for chemically rendering the dangerous transparent gas more or less opaque, when the same effect will be attained. The chemical process for changing the dangerous transparent gas, may be for example a combustion.

I will now proceed to describe my invention with reference to the accompanying drawing, in which—

Figure 1 is a diagram of an apparatus for electrically detecting a dangerous opaque gas, such as for example smoke, Fig. 2 is a diagram of an apparatus for electrically detecting a dangerous transparent gas, the secondary circuit being omitted, and Fig. 3 is a part of another apparatus for electrically detecting a dangerous transparent gas.

Similar letters of reference refer to similar parts throughout the several views.

In Fig. 1 I have shown an apparatus for electrically detecting smoke or the like in a room or building. $u$ denotes a source of energy for supplying an electric incandescent lamp $b^1$ with current. A primary circuit $v^1$ $v^2$ is provided, which includes a source of current $v$ (for example a battery), a selenium cell $b^{11}$ and an electromagnet $c$ of any known construction. The selenium cell $b^{11}$ is shown as disposed within a box $b^4$ and exposed to the rays of light emanating from the incandescent lamp $b^1$ through a convenient tube $b$. A reflector $b^{111}$ may be disposed on the source of energy $u$ for deflecting the rays of light meeting it and for throwing them to the selenium cell $b^{11}$. The tube $b$ may be connected with two opposite tubes $a$ and $a^1$, which are so bent as to permit no foreign light to enter the tube $b$. The two opposite tubes $a$ and $a^1$ are preferably so disposed, that any smoke produced on the place from some reason can easily pass through them upwards while crossing or intercepting the rays of light that pass from the lamp $b^1$ to the selenium cell $b^{11}$. A secondary circuit $x$ $x^1$ $x^2$ is provided, which is shown as comprising a source of current $e^1$ (for example a battery), the armature $d$ of the electromagnet $c$, an adjustable stop $f$ and an electric alarm I of any known construction. The armature $d$ is normally attracted by the electromagnet $c$ and is arranged to be detached and pressed on the adjustable stop $f$ by a spring $e$ on the electromagnet $c$ becoming too weak. A hook $g$ may be provided, which normally rests on the end of the armature $d$ and is adapted to snap behind the latter when detached and to press it on the stop $f$, so as to cause the alarm I to continuously sound. For stopping the alarm I at any moment it is only necessary to turn the hook $g$ upwards and to place it against a stop $h$. Where so preferred, a further device of any known construction may be placed under the control of the secondary circuit. For example a water pipe system may be disposed in the respective room or building for extinguishing a fire in any known manner and of this pipe system only a tube $t$ with a water cock $k$ and a supply tube $t^1$ is shown in Fig. 1. A spring $l$ may be provided for pressing the handle $i$ on the plug of the water cock $k$ against a suitable stop $s$ and thus maintaining the cock in its open state. A convenient bent lever $p$ may be provided for engaging with its upper arm a tooth $r$ on a cam disk fastened on the plug of the cock $k$. The handle $i$ can then be turned through an angle of 90° while straining the spring $l$ until the lever $p$ snaps behind the tooth $r$ and holds the plug in its closing position. Another bent lever $n$ $o$ may be provided and a spring $q$ may press its horizontal arm $n$ on a convenient insulated stop disposed on the spring-pressed armature $m$ of the electric alarm I while the upper vertical arm $o$ merely leans against the lower arm of the bent lever $p$.

This apparatus operates as follows: All the parts occupy their normal positions shown in Fig. 1, so that the rays of light projected from the incandescent lamp $b^1$ to the selenium cell $b^{11}$ reduce the resistance of the latter and the current circulating in the primary circuit $v^1$ $v^2$ is sufficiently strong to energize the electromagnet $c$ for attracting its armature $d$. The secondary circuit $x$ $x^1$ $x^2$ is on the contrary broken, so that the electric alarm I is at rest and the water is shut off from the pipe system by the water cock $k$. Things will continue, as long as everything is all right. Should smoke be originated from some reason in the respective room or building and pass upwards through the tube $a$, across the tube $b$ and through the tube $a^1$, it will intercept or weaken the rays of light passing through the tube $b$. In consequence of this the resistance of the selenium cell $b^{11}$ will increase, and the strength of the current circulating in the primary circuit $v^1$ $v^2$ will decrease, so that the electromagnet $c$ will release its armature $d$ which will be pressed on the adjustable stop $f$ by the spring $e$ and thus close the secondary circuit $x$ $x^1$ $x^2$. Then the electromagnet of the alarm I will be for a moment energized and attract its armature $m$, whereby the bent lever $n$ $o$ is released, so that the spring $q$ will by the upper arm $o$ push the bent lever $p$ out of engagement with the tooth $r$, whereupon the spring $l$ will open the water cock $k$. Then the water thus admitted to the pipe system will serve for extinguishing the smoke or fire in any known manner. The hook $g$ will lock the armature $d$, so that the secondary circuit will remain closed and the alarm I will keep sounding. For stopping the alarm I the hook $g$ is withdrawn and placed against the stop $h$. After the smoke or fire has been extinguished, the water cock $k$ may be closed by hand and be locked by the bent lever $p$, while the horizontal arm $n$ of the lever $n$ $o$ is made to engage the lug on the armature $m$. The hook $g$ is turned downwards, so that its hooked end rests on the upper end of the armature $d$ as is shown.

In case no smoke but a dangerous transparent gas, such as foul gases in a colliery, is to be detected, a band $w$ impregnated with a suitable chemical may be passed across the tube $b$ on the place where the curved tubes $a$ and $a^1$ cross the tube $b$, as is for example shown at Fig. 2. In this figure the band $w$ is shown as passing upwards from a roll $w^1$ below to another roll $w^2$ above over suitable guiding rollers $y$ $y^1$. A box $z$ is shown as attached to the tube $b$ and inclosing the lower roll $w^1$ and being filled with a liquid chemical. It is essential, that the band $w$ impregnated with the chemical shall remain transparent as long as everything is all right in the respective room, but become dark the moment that the dangerous transparent gas passing through the tubes $a$ and $a^1$ and across the tube $b$ acts upon the chemical in the band $w$. The band $w$ may be moved in any known manner. For example a clockwork may be arranged for unwinding it from the lower roll $w^1$ and for winding it on the upper roll $w^2$ and any known mechanism may be provided for reversing from time to time the motion of the two rolls $w^1$ and $w^2$ and thus keeping the band $w$ moving. Or the band $w$ may be simply shifted by hand, for example by means of a handle $w^3$ on the upper roll $w^2$, so as to remove its portion acted upon by the dangerous transparent gas and rendered more or less opaque from the interior of the tube $b$ and to expose a fresh transparent portion to the rays of light passing from the lamp $b^1$ through the tube $b$ to the selenium cell $b^{11}$. The liquid chemical in the box $z$ may be for example a solution of palladium chlorid, which has the property of blackening linen impregnated with it, if dangerous transparent gases such as carbonic oxid, carbonic acid, illuminating gas, methane, ethylene, or the like pass across the tube $b$ and act upon the linen on both sides. A mixture of a solution of ammoniacal cuprous chlorid with a solution of sodium-palladium chlorid impregnating the linen band $w$ has the property of forming a weak cloud of finely distributed palladium in the presence of carbonic oxid. It is obvious, that such chemicals coloring the band $w$ under the action of dangerous transparent gases will produce much the same effect as the smoke in the manner described above. From Fig. 2 parts have been omitted, which are shown in Fig. 1, but it is easily to be understood, that these parts may be employed with the apparatus shown in Fig. 2 as well, or at any rate a secondary circuit $x$ $x^1$ $x^2$ with suitable devices for warning or other purposes must be provided.

Instead of impregnating a band of linen or the like with chemicals and exposing it to the action of dangerous transparent gases for operating the apparatus, the dangerous transparent gases may be chemically treated for actuating a suitable apparatus. For example the dangerous transparent gases may be rendered more or less opaque by combustion. A suitable apparatus serving this purpose is illustrated in Fig. 3. A lamp A similar to a miner's safety-lamp is employed, which may comprise a mantle K with a tube C, a wire basket B with a window D in front of the tube C, a reflector F and a cover H for closing the upper opening G of the mantle K. At the end of the tube C a selenium cell E is disposed, which is inserted in a primary circuit $v^1$ $v^2$ $v^3$ including a battery $v$ and two electromagnets $c$ and L. The electromagnet $c$ is the same as that in Figs. 1 and 2 and is arranged to release its armature for closing a secondary circuit (not shown). The cover H may be pressed downwards by a suitable weight M and is normally attracted by the electromagnet L for permitting the lamp A to burn. Where so preferred a second window similar to D may be provided in the wire basket B in front of the reflector F. Air is admitted from below to the lamp A in a similar manner as in a miner's safety-lamp. The flame of the lamp will emit rays of light through the window D and the tube C to the selenium cell E for reducing its resistance. This pencil of rays of light will be strengthened by the reflector F. Where so preferred, a suitable filter may be provided in any known manner for keeping off any coal-dust from the lamp. When fire-damp or carbonic oxid passes through the lamp A, it will burn with a blue flame, whereby the selenium cell E will be darkened, so that the strength of the current circulating in the primary circuit $v^1$ $v^2$ $v^3$ will be reduced. In consequence of this the electromagnet L will release the cover H which drops and closes the opening G for extinguishing the lamp A and the other electromagnet $c$ will release its armature for closing the secondary circuit and thereby actuating the alarm or other devices.

The apparatus described may be varied in many respects, while the principle of the invention remains the same.

I claim:

1. The method of electrically detecting dangerous gases, which consists in passing the dangerous gas across rays of light projected from a source of light to a selenium cell inserted in a primary circuit for darkening the selenium cell and reducing the strength of the current circulating in the primary circuit, whereby electromagnetic devices are caused to close a secondary circuit for actuating warning or other devices.

2. The method of electrically detecting dangerous opaque gases, which consists in passing the gas across rays of light projected from a source of light to a selenium cell inserted in a primary circuit for darkening the selenium cell and reducing the strength of the current circulating in the primary circuit, whereby electromagnetic devices are caused to close a secondary circuit for actuating warning or other devices.

3. The method of electrically detecting dangerous transparent gases, which consists in passing the gas across rays of light projected from a source of light to a selenium cell inserted in a primary circuit, and in chemically rendering the transparent gas opaque for darkening the selenium cell and reducing the strength of the current circulating in the primary circuit, whereby electromagnetic devices are caused to close a secondary circuit for actuating warning or other devices.

HEINRICH FREISE.

Witnesses:
ALFRED POHLMEYER,
M. ENGELS.